Figure 2:
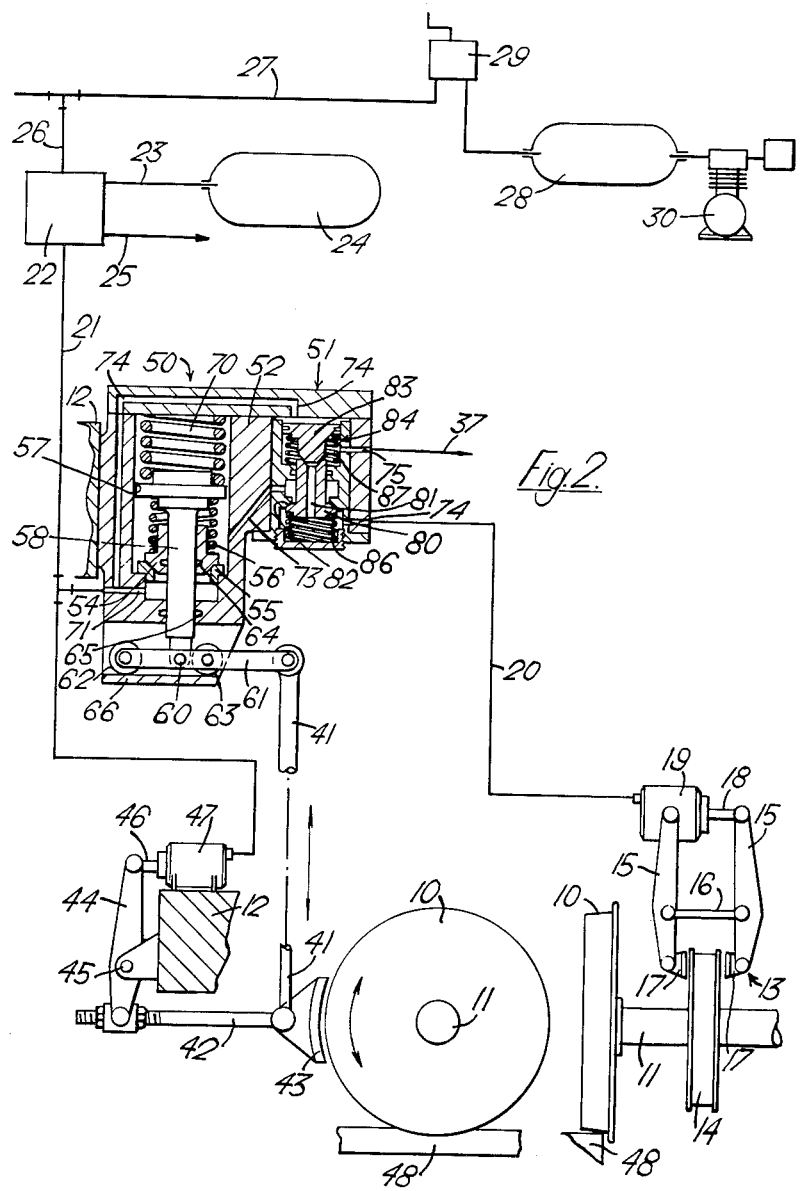

Nov. 30, 1965  A. WOOLER  3,220,781

VEHICLE BRAKING SYSTEM

Filed Sept. 19, 1963  2 Sheets-Sheet 1

Fig.1.

United States Patent Office 3,220,781
Patented Nov. 30, 1965

3,220,781
VEHICLE BRAKING SYSTEM
Anthony Wooler, Mickleover, Derby, England, assignor to Rolls-Royce Limited, Derby, England, a company of Great Britain
Filed Sept. 19, 1963, Ser. No. 310,105
Claims priority, application Great Britain, Oct. 18, 1962, 39,539/62
11 Claims. (Cl. 303—68)

This invention relates to a vehicle braking system, and is hereinafter described with reference to, although in no way limited to, its use on a railway locomotive or rolling stock.

Braking systems are usually designed such that maximum braking power will provide minimum stopping distances when used under normal, favourable conditions. However, such maximum braking power, when applied to wheels under unfavourable conditions e.g. a wet track, which is condusive to skidding, will cause the wheels to skid. The minimum stopping distance is not obtained with skidding wheels, and thus it is necessary to reduce the braking power to a value at which skidding does not occur. To obtain minimum stopping distances, the largest possible braking power, consistent with skid-free braking, is required.

According to the present invention there is provided a vehicle braking system in which the pressure of the fluid supplied to a fluid operated braking mechanism is controlled in a range betwen predetermined minimum and maximum values by control means responsive to the co-efficient of friction existing between the rim or tyre of a wheel and a member adapted to be brought into contact with the rim or tyre, the arrangement being such that the pressure of the fluid supplied to the braking mechanism is varied in proportion to variation in the value of said co-efficient of friction.

According to a further aspect of the present invention there is provided a vehicle braking system in which the pressure of the fluid supplied to a fluid operated braking mechanism is increased above a predetermined minimum value and up to a predetermined maximum value by control means responsive to the co-efficient of friction existing between the rim or tyre of a wheel and a member adapted to be brought into contact with and moved by the rim or tyre, the arrangement being such that the fluid pressure can be increased above the predetermined minimum value only when the co-efficient of friction is at a value which is sufficient to cause movement of the member.

Preferably the co-efficient of friction between the rim or tyre and the member when the two are in contact is substantially the same as the co-efficient of friction occurring between the rim or tyre of the wheel and a surface with which the wheel is in contact.

In a preferred arrangement the said control means comprises a spring-loaded relief valve arranged in a fluid line leading to the braking mechanism, said spring having a variable abutment adapted to be moved by a cam and/or a lever connected to said member, said member being capable of angular movement, under the action of the rim or tyre which it may contact, in order to move the cam or lever.

Preferably the pressure relief valve initially allows fluid at the predetermined minimum value to flow along a fluid line to operate the braking mechanism in order to obtain a minimum braking load on the wheel even though the operator has selected a maximum braking pressure, subsequent angular movement of the shoe when contacting the rim or tyre of the wheel varying the spring-loading on the valve, in accordance with the value of said co- efficient of friction, to increase the pressure of the fluid applied to the braking mechanism.

In one possible arrangement, the fluid under pressure which is prevented from passing to said braking mechanism by said spring-loaded pressure relief valve is directed to atmosphere.

Alternatively, and preferably, the fluid under pressure which is prevented from passing to said braking mechanism is used to operate a valve device disposed downstream of said pressure relief valve, in the fluid line leading to the braking mechanism the valve device acting to permit or prevent flow of fluid under pressure from the pressure relief valve to the braking mechanism. The valve device may also connect and disconnect the braking system and fluid line leading thereto, to atmosphere, when it respectively prevents and permits flow of fluid under pressure from the pressure relief valve to the braking mechanism.

The said member preferably comprises a shoe mounted on a longitudinally and angularly movable actuating rod, said actuating rod being moved longitudinally by a ram supplied with the said fluid.

Preferably the braking mechanism comprises a disc brake associated with a shaft connected to the wheel.

The invention also includes a railway locomotive or rolling stock provided with a braking system as set forth above.

The invention is illustrated, merely by way of example in the accompanying drawings in which:

FIGURE 1 shows, diagrammatically, a braking system according to the present invention, and FIGURE 2 shows a modified form of the braking system of FIGURE 1.

Referring to the drawings, a railway locomotive (parts only of which are shown) comprises a bogie 12 supporting an axle 11 on which is rotatably mounted a wheel 10. The wheel 10 has a braking system which includes a disc brake 13. The disc brake 13 comprises a disc 14 which is formed on the axle 11.

Two arms 15 are arranged one on either side of the disc 14 and they are pivotally interconnected by a link 16. The lowermost end of each arm 15 (adjacent to the disc 14) carries a friction pad 17. The uppermost end of one arm 15 is connected to a piston rod 18 of an operating ram and the uppermost end of the other arm 15 is pivotally connected to a cylinder 19 of the operating ram. Air under pressure is supplied through a pipe 20 to operate the operating ram.

The pipe 20 receives air under pressure from a pipe 21 which leads from a valve 22. Also connected to the valve 22 is a pipe 23 which connects with an auxiliary reservoir 24, a pipe 25 which leads to atmosphere and a pipe 26 which is connected via a pipe 27 to a main reservoir 28. A driver's brake valve 29 is located in the pipe 27 and the main reservoir 28 is supplied with air compressed in a pump 30.

Located in the pipe 20 is a relief valve 31 which comprises a valve member 32 adapted to contact a valve seat 33 provided in a casing 34 which is secured to the bogie 12. The valve member 32 is loaded in the sense of closing by a coil spring 35 which has a variable abutment in the form of a piston 36. The interior of the casing 34 is vented to atmosphere through a pipe 37.

The piston 36 supports a roller 38 which contacts a cam surface 39 provided on one end of a lever 40 which is pivoted at 40a to the casing 34. Pivotally connected to the other end of the lever 40 is a link 41 which serves to connect the lever 40 to an actuating rod 42.

Attached to the end of the actuating rod 42 nearest the wheel 10 is a shoe 43 and the end of the rod 42 remote from the shoe 43 is pivotally connected to one end of a lever 44 which is pivoted at 45 to the bogie 12. The other end of the lever 44 is pivotally connected to the piston rod 46 of an operating ram 47 which is supplied with air under pressure from pipe 21.

The material from which the shoe 43 is made is arranged to provide with the rim of the wheel 10 a co-efficient of friction which is substantially the same as the co-efficient of friction which exists between the rim of the wheel 10 and a rail 48 along which the wheel 10 runs.

In operation, compressed air is supplied from the pump 30 to the main reservoir 28 and the auxiliary reservoir 24. When the driver opens the brake valve 29, the presssure in the pipes 26 and 27 falls. Valve 22 operates to allow air under pressure from the auxiliary reservoir 24 to flow into pipes 21 and 20. At this instant the piston 36 will be in its lowermost position, as shown in FIGURE 1, and the valve member 32 will only be loaded by the minimum compression of the spring 35.

This minimum compression of the spring 35 will be overcome by the pressure of the air in pipe 21, and the valve member 32 will move away from the valve seat 33 so that a proportion of the air under pressure will flow to atmosphere through the pipe 37. Thus the pressure of the air in the pipe 29 will fall to a value determined by the resilience of the spring 35 in its state of minimum compression. This predetermined low pressure will pass to the cylinder 19 of the brake operating ram, and the piston will cause the arms 15 to pivot about the link 16, thus bringing the friction pads 17 into contact with the disc 14 thereby producing a minimum braking load on the wheel 10.

The air under pressure in pipe 21 also flows to the operating ram 47 which causes the lever 44 to pivot about the pivot 45 and urge the actuating rod 42 towards the wheel 10. This moves the shoe 43 into contact with the rim of the wheel 10.

If the co-efficient of friction between the shoe 43 and the rim of the wheel 10 is high, for example if the wheel is dry, then the shoe 43 will move angularly relative to axle 11, and the link 41 will rock the lever 40 about the pivot 40a. When the lever 41 rocks, the roller 38 will be moved upwardly by the cam surface 39 and consequently the piston 36 will be moved upwardly increasing the loading of spring 35 on the valve member 32. As the loading on the valve member 32 increases, the pressure in pipe 20 will rise towards its maximum value and the friction pads 17 will be urged towards the disc 14 by a greater force which thus produces the maximum braking load on the wheel 10.

If, when the shoe 43 contacts the rim of the wheel 10, the co-efficient of friction between the two is low due to a wet or polished rim, then the shoe 43 may not move angularly. In this case, the spring loading on the valve member 32 will not be increased, the pressure of the air in pipe 20 will not increase above the predetermined minimum value, and therefore the full braking pressure cannot be applied to the friction pads 17. This will prevent the wheel 10 skidding on the rail 48.

Again, should the shoe 43 only move through a small angle, due to the co-efficient of friction being between its maximum and minimum values, the maximum braking pressure will not be applied. In each case, the braking pressure applied will be in proportion to the value of the co-efficient of friction existing at the moment of operation.

It will be appreciated that by making the co-efficient of friction between the rim of the wheel 10 and the shoe 43 substantially the same as the co-efficient of friction between the rim of the wheel 10 and the rail 48 then the shoe 43 senses the degree of friction occurring at the wheel and the rail and prevents full braking pressure being applied to the friction pads 17 when the conditions are condusive to skidding. It operates before a skid has actually started to thus reduce the stopping distance.

It will be appreciated that the material of the shoe 43 need not be chosen to be such as to make the co-efficient of friction between the rim of wheel 10 and the shoe 43 identical with or even similar to that between rim of wheel 10 and the rail 48, provided suitable adjustment of the relief valve 31 is effected to regulate its effect on the braking system to account for the different co-efficients of friction.

Referring to FIGURE 2 there is shown a braking system which is identical to that shown in FIGURE 1 apart from an alternative form of relief valve 31. Similar components have been given similar reference numerals in FIGURES 1 and 2.

In place of relief valve 31 there is provided a further relief valve 50 and a valve 51. The valve 51 is also mounted in fluid pressure line 20, downstream of relief valve 50. Both relief valve 50 and valve 51 are disposed within a common housing 52.

Relief valve 50 comprises a valve member 54 adapted to seat onto a valve seat 55 within housing 52. Valve member 54 is urged towards valve seat 55 by a compression spring 56, disposed between valve member 54 and an abutment 57. Abutment 57 is provided on a valve rod 58 which is pivotally connected at 60 to a rocking lever 61. Rocking lever 61 is pivotally connected to the link 41 and also to rollers 62, 63 which rest upon a surface 66. The valve rod 58 passes through the valve member 58 and housing 52, being slidable therein within seals 64, 65. Disposed between the abutment 57 and valve housing 52 is a further compression spring 70, opposing spring 56 and urging the abutment vertically downwardly.

The relief valve 50 has an inlet constituted by a passage 71 and an outlet constituted by a passage 73. A bypass passage 74 connects the passage 71 to an inlet 74 to the valve 51.

Valve 51 also comprises a further inlet constituted by passage 73 and further ports 74, 75. Port 74 connects with fluid line 20 and port 75 vents the valve to atmosphere through the line 37.

Disposed within valve housing 52 is a valve member 80 having a central drilling 81 therethrough, valve member 80 is adapted to seat on a valve seating 82. A piston 83 disposed within a cylinder 84 is adapted to contact valve member 80 and to seal the upper end of drilling 81. Valve member 81 and piston 83 are urged vertically upwardly by springs 86, 87, respectively.

As shown in FIGURE 2 the components are in the "off" position, with no brakes applied. When the driver applies the brakes, in the manner set forth above, air under pressure enters line 21, flowing to passages 71 and 74, as well as to operating ram 47. Air under pressure will lift valve member 54 a small amount against spring 56. Air under pressure within passage 74 will act upon piston 83, urging it vertically downwardly. Piston 83 will contact valve member 80, urging it downwardly out of contact with seating 82. Thus air under pressure will flow through passage 73 to line 20. However, this air will be at a relatively low pressure since valve member 54 is not lifted particularly high, and thus the brakes will be applied only lightly.

Should the co-efficient of friction be high, and further pressure is required for harder braking, link 41 will rise, as described with reference to FIGURE 1, and lever 61 will pivot about roller 62, thus lifting valve rod 58. Since the abutment 57 rises, the force applied by spring 56 is reduced, and thus member 54 will lift further off seat 55 under the pressure of air in passage 71. Thus air under higher pressure will be supplied to line 20 to apply the brakes with more force.

When the brakes are released, line 21 is exhausted of air under pressure, thus causing valve member 54 and 80 to return to their seats 55 and 82 respectively. With no air under pressure in passage 74, piston 83 will fit off member 80, thus leaving drilling 81 unblocked. Air under pressure in line 20 and the brake mechanism will therefore exhaust to atmosphere through port 74, drilling 81 and port 75.

It will be appreciated that the main advantage of the device of FIGURE 2 over that of FIGURE 1 is that there is no wastage of compressed air through line 37 to atmosphere when the brakes are only partially applied.

The braking system described may, of course, be applied to any vehicle, including those with wheels having tyres mounted about their rims.

The shoe 43 also serves to keep the rim of the wheel 10 clean.

I claim:

1. A vehicle braking system comprising a fluid operated braking mechanism, means for supplying fluid under pressure to said braking mechanism, a wheel, a member adapted to be brought into contact with the ground engaging surface of said wheel, means for bringing said wheel and member into contact, and control means, responsive to variation in the value of the coefficient of friction existing between the wheel and member, controlling the pressure of the fluid supplied to said braking mechanism, between predetermined minimum and maximum values, in proportion to variations in said value.

2. A vehicle braking system comprising a fluid operated braking mechanism, means for supplying fluid under pressure to said braking mechanism, a wheel, a member adapted to be brought into contact with and moved by the ground engaging surface of said wheel, means for bringing said wheel and member into contact, and control means, responsive to variation in the value of the coefficient of friction existing between the wheel and member, controlling the pressure of the fluid supplied to said braking mechanism, between predetermined minimum and maximum values, in proportion to variations in said value, the control means increasing the pressure of the fluid above said predetermined minimum value only when the coefficient of friction is at a value sufficient to cause movement of the member.

3. A vehicle braking system comprising a fluid operated braking mechanism, means for supplying fluid under pressure to said braking mechanism, a wheel, a surface with which the wheel is in rolling contact, a member adapted to be brought into contact with the ground engaging surface of said wheel, the co-efficients of friction between said wheel and said member and between said wheel and said surface, being substantially the same, means for bringing said wheel and member into contact, and control means, responsive to variation in the value of the co-efficient of friction existing between the wheel and member, controlling the pressure of the fluid supplied to said braking mechanism, between predetermined minimum and maximum values, in proportion to variations in said value.

4. A vehicle braking system comprising a fluid operated braking mechanism, a fluid line to said braking mechanism, means for supplying fluid under pressure to said braking mechanism through said fluid line, a wheel, a member adapted to be brought into contact with the ground engaging surface of said wheel, means for bringing said wheel and member into contact, a spring-loaded relief valve arranged in said fluid line, a variable abutment for said spring, and a cam connected between said variable abutment and said member, angular movements of said member about said wheel moving the cam and thus controlling the pressure of the fluid supplied to said braking mechanism, between predetermined minimum and maximum values, in proportion to variation in the co-efficient of friction existing between the wheel and said member.

5. A vehicle braking system comprising a fluid operated braking mechanism, a fluid line to said braking mechanism, means for supplying fluid under pressure to said braking mechanism through said fluid line, a wheel, a member adapted to be brought into contact with the ground engaging surface of said wheel, means for bringing said wheel and member into contact, a spring-loaded relief valve arranged in said fluid line, a variable abutment for said spring, and a cam connected between said variable abutment and said member, angular movements of said member about said wheel moving the cam and thus controlling the pressure of the fluid supplied to said braking mechanism, between predetermined minimum and maximum values, in proportion to variations in the co-efficient of friction existing between the wheel and said member, the spring-loaded relief valve initially allowing fluid at the predetermined minimum value to flow along said fluid line to operate the braking mechanism and obtain a minimum braking load on the wheel even though the operator has selected a maximum braking pressure, subsequent angular movement of the shoe when contacting the rim or tyre of the wheel varying the spring-loading on the valve, in accordance with the value of said co-efficient of friction, to increase the pressure of the fluid supplied to the braking mechanism.

6. A vehicle braking system comprising a fluid operated braking mechanism, a fluid line leading to said braking mechanism, means for supplying fluid under pressure to said braking mechanism through said fluid line, a wheel, a member adapted to be brought into contact with the ground engaging surface of said wheel, means for bringing said wheel and member into contact, and a pressure relief valve, disposed in said fluid line and responsive to variation in the value of the co-efficient of friction existing between the wheel and member, controlling the pressure of the fluid supplied to said braking mechanism, between predetermined minimum and maximum values, in proportion to variations in said value, the fluid under pressure which is prevented from passing to said braking mechanism by said pressure relief valve being directed to atmosphere.

7. A vehicle braking system comprising a fluid operated braking mechanism, a fluid line leading to said brake mechanism, means for supplying fluid under pressure to said braking mechanism through said fluid line, a wheel, a member adapted to be brought into contact with said wheel, means for bringing said wheel and member into contact, a pressure relief valve disposed in said fluid line and responsive to variation in the value of the co-efficient of friction existing between the wheel and member, controlling the pressure of the fluid supplied to said braking mechanism, between predetermined minimum and maximum values, in proportion to variations in said value, and a valve device, disposed downstream of said pressure relief valve, and acting to permit or prevent flow of fluid under pressure from the pressure relief valve to the braking mechanism, the fluid under pressure which is prevented from passing to the braking mechanism being used to operate said valve device.

8. A vehicle braking system as claimed in claim 7 wherein the valve device also connects and disconnects the braking system and fluid line leading thereto, to atmosphere, when it respectively prevents and permits flow of fluid under pressure from the pressure relief valve to the braking mechanism.

9. A vehicle braking system comprising a fluid operated braking mechanism, means for supplying fluid under pressure to said braking mechanism, a wheel, a shoe adapted to be brought into contact with the ground engaging surface of said wheel, a longitudinally and angularly movable actuating rod on which said shoe is mounted, a ram supplied with said fluid to move said rod and thereby bring said wheel and member into contact, and control means, responsive to variation in the value of the co-efficient of friction existing between the wheel and member, controlling the pressure of the fluid supplied to said braking mechanism, between predetermined minimum and maximum values, in proportion to variations in said value.

10. A vehicle braking system comprising a fluid operated disc brake, means for supplying fluid under pressure to said disc brake, a wheel, a member adapted to be brought into contact with said wheel, means for bringing said wheel and member into contact, and control means, responsive to variation in the value of the co-efficient of friction existing between the wheel and member, controlling the pressure of the fluid supplied to said disc brake, between predetermined minimum and maximum values, in proportion to variations in said value.

11. A vehicle provided with a braking system comprising a fluid operated braking mechanism, means for supplying fluid under pressure to said braking mechanism, a wheel, a member adapted to be brought into contact with the ground engaging surface of said wheel, means for bringing said wheel and member into contact, and control means, responsive to variation in the value of the co-efficient of friction existing between the wheel and member, controlling the pressure of the fluid supplied to said braking mechanism, between predetermined minimum and maximum values, in proportion to variations in said value.

References Cited by the Examiner
UNITED STATES PATENTS 2,418,288  4/1947  Benning _____ 188—181

EUGENE G. BOTZ, *Primary Examiner.*